(No Model.)
E. L. DAWES & W. A. MYLER.
COOKING VESSEL.
No. 403,093. Patented May 14, 1889.
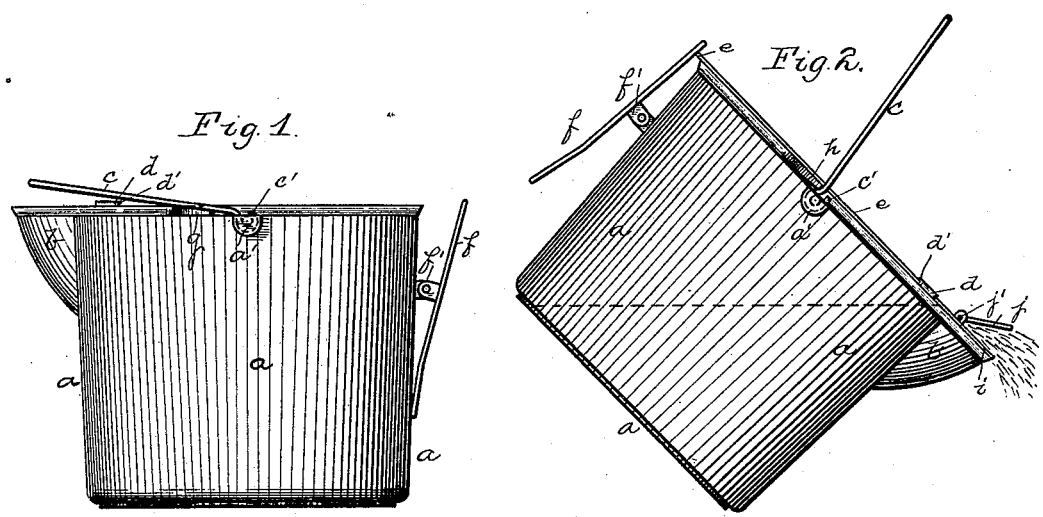
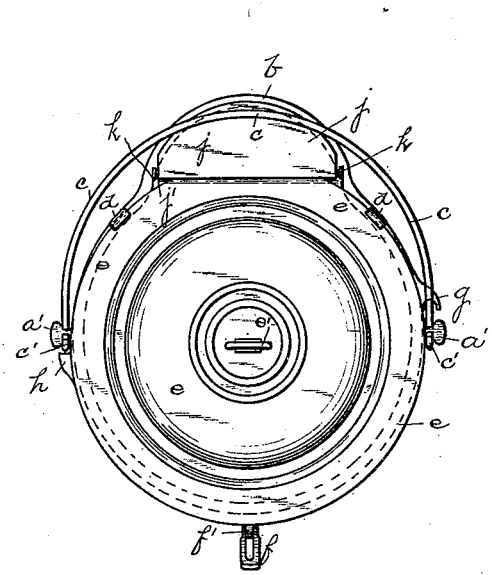
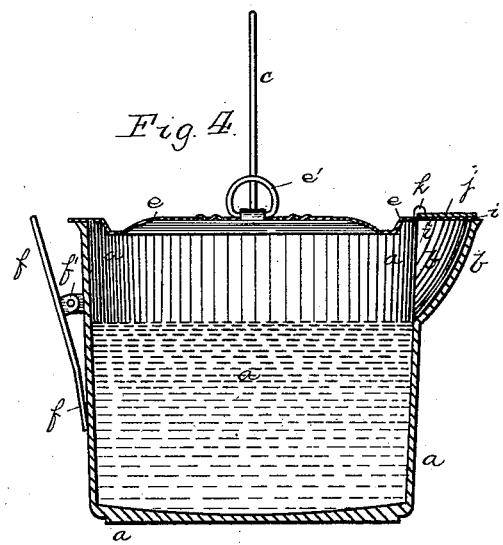
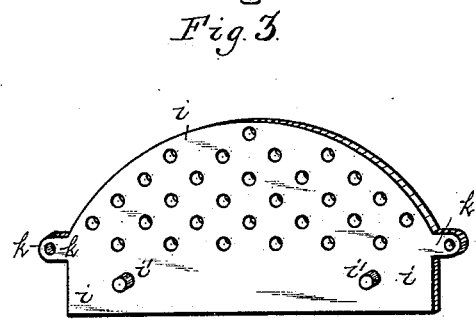
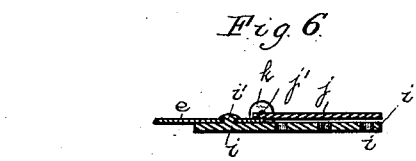
Witnesses:
J. N. Cooke
Robt. D. Totten
Inventors
Edward L. Dawes.
William A. Myler.
By James I. Kay
Attorney

UNITED STATES PATENT OFFICE.

EDWARD L. DAWES AND WILLIAM A. MYLER, OF NEW BRIGHTON, PENNSYLVANIA.

COOKING-VESSEL.

SPECIFICATION forming part of Letters Patent No. 403,093, dated May 14, 1889.

Application filed May 4, 1888. Serial No. 272,779. (No model.)

*To all whom it may concern:*

Be it known that we, EDWARD L. DAWES and WILLIAM A. MYLER, residents of New Brighton, in the county of Beaver and State of Pennsylvania, have invented a new and useful Improvement in Cooking-Vessels; and we do hereby declare the following to be a full, clear, and exact description thereof.

Our invention relates to an improvement in cooking utensils, and more especially to covers and means for holding said covers firmly in position.

The great inconvenience experienced in the use of cooking utensils is due to the intense heat to which the vessel is exposed when upon the stove or range, and the difficulty and often danger which arises from burning or scalding the hand in handling such vessels, on account of the hand coming in contact with the highly-heated surface of the vessel or its handle or bail, and in tilting the vessel some means must be employed to hold the lid securely in position, so that the contents of the vessel cannot escape therefrom.

Our invention relates specially to that class of cooking-vessels in which the vessel is provided with means for holding the cover in position, and means are provided for straining the contents of the vessel. In the vessels heretofore in use the strainer has either been secured in the spout and separate from the cover, in which case there was great difficulty in keeping the spout and strainer clean and pure, or the strainer was formed in the circular lid and no pouring-spout was employed, rendering the pouring operation more difficult. By our invention these difficulties are overcome, and at the same time we are enabled to form the combined cover and strainer at comparatively small cost, as we employ the ordinary circular spun lid and secure a malleable metal strainer thereto, and at the same time provide means for securing the flap over the strainer. We have also improved the vessel in other particulars.

To enable others skilled in the art to make and use our invention, we will describe the same more fully, referring to the accompanying drawings, in which—

Figure 1 is a side view showing handle down; Fig. 2, side view of vessel tilted; Fig. 3, top view; Fig. 4, longitudinal section; Fig. 5, perspective view of strainer; Fig. 6, cross-section of strainer and flap, showing it attached to the lid.

Like letters of reference indicate like parts in each.

Our invention is shown in connection with the kettle $a$, which is provided with the spout $b$ and the handle or bail $c$, having loops $c'$, passing over the pivot-pins $a'$ of the kettle $a$. On the edge of the kettle, near the spout or lip $b$, are cast the lugs $d$, with the inwardly-projecting lips or flanges $d'$, and against said lugs $d$ and beneath said flanges $d'$ the cover $e$ rests when in position. This cover $e$ is made of suitable tin or other sheet metal provided with a handle, $e'$, and is inserted beneath the lips or flanges $d'$, the space between the lips $d'$ and the top of the vessel being sufficient to permit the cover to be easily slipped under and removed therefrom, these lips $d'$ preventing the cover from sliding off when the vessel is tilted. In order to force the cover $e$ against the said lugs a lever, $f$, is suitably pivoted to the body of the kettle on the side opposite from the spout and at a suitable distance from the rim of the kettle. This lever $f$ is pivoted slightly below its center by means of a pin passing through a bearing, $f'$, upon which it can move freely, and when not in use the base of the lever rests against the side of the kettle, and the upper end thereof extends above the top edge of the kettle, though not in contact therewith; but when the lower end is drawn out the upper end is forced against the edge of the cover and keeps the cover securely within the lips $d'$, which retain it and prevent it from falling off the vessel, the cover being thus held firmly in place by the lips $d'$ and lever $f$ when the vessel is tilted, the pressure of the lever upon the edge of the cover being sufficient to hold it against the pressure of the liquid or solid contents of the vessel in pouring the liquid contents therefrom. A lug or lugs, $g$, and a lug or lugs, $h$, are also cast on the sides of the vessel close to the rim thereof. The lugs $g$ are placed toward the spout of the vessel and in front of the pins $a'$, on which the bail $c$ is pivoted to the kettle in order to prevent the bail from dropping down sufficiently low to rest on the top of the kettle, the lugs $g$ permitting the bail to drop down near to the cover, but not to touch it, so that it is out of the way of the cover when it is placed on and lifted off, and yet not become heated by contact with the vessel. The lugs $h$ are placed on the other side of the pin $a'$ and close to the pin, so that when the bail presses against it the bail is held upright, such as when the vessel is tilted in pouring off the liquid contents. By this arrangement the bail is not allowed to come in contact with the highly-heated surface of the kettle, and is kept comparatively cool, and pouring of the contents therefrom is facilitated.

Although we have described two sets of lugs, $g$ and $h$, respectively, on both sides of the kettle, one lug in front to prevent the bail dropping forward and one in the rear to prevent it dropping in the opposite direction are all that are necessary, and said lugs may be placed one on one side and one on the other side of the kettle.

The cover $e$ is formed circular, and may therefore be spun or stamped to shape, this being the cheapest form of cover made, and at the same time to provide for the strainer over the spout we attach to the circular cover the strainer $i$, which is formed of cast metal and malleableized, this strainer conforming to the shape of the spout, and so at small additional cost enabling us to use the circular cover with the spouted vessel. The strainer $i$ has the prongs $i'$ cast thereon, as many as necessary, and these prongs enter corresponding perforations in the sheet-metal cover $e$, and are then riveted securely to said cover, so attaching the strainer to the cover, the strainer being formed of malleable cast-iron. This manner of securing the strainer to the cover obviates the necessity of using rivets or the casting or drilling of holes in the strainer, as the prongs $i'$ act as rivets.

To secure the flap $j$ to the strainer and form a hinge therefor, the strainer $i$ has cast thereon the projections or wings $k$, with holes therein, and said wings are adapted to be turned up to receive the ends $j'$ of the flap $j$. One wing is bent up and one of the ends $j'$ of the flap inserted in the hole therein. Then the other end is bent up to receive the other end of the flap, thereby forming a hinge. The advantage of this manner of forming a compound cover and strainer is that where the vessel has the ordinary pouring spout or lip the ordinary circular sheet-metal cover or lid could not be arranged to steam the materials, and even if it could be formed of one piece to the desired shape it would be too weak to sustain the pressure of the materials during the steaming operation, and would soon bend out of shape. Where, however, the strainer is made separate, being made of malleable iron, it is much stronger and stiffer, and can be secured to the ordinary circular lid in such way as to form a durable strainer to stiffen that portion of the cover and to cheapen the cost of manufacture, as it enables us to use this kind of a cover, and, further, the strainer can be quickly secured to the cover by means of prongs formed thereby.

When it is desired to strain the contents of the vessel—that is, to pour off the liquid while retaining the solid contents of the vessel—the user raises the bail until the lower end thereof, near the pivot-pin $a'$, strikes against the lug or lugs $h$, and then raises the lever $f$ until its upper arm or end presses against the edge of the cover $e$, and so forces the edge of the cover against the lugs $d$, forming the bases of the lips $d'$, so retaining the cover in place during pouring. As he raises the rear end of the vessel by means of the lever $f$, he so tilts the vessel, and as this is done the liquid passes out through the strainer, raising at the same time the flap $j$, and as the strainer is rigid with the cover the solid contents are retained by it and the cover and all the liquid contents of the vessel can be drained off. During the time the vessel is on the stove the flap retains the steam within the vessel and the lug or lugs $g$ hold up the handle, so that its upper end does not come in contact with the vessel.

What we claim as our invention, and desire to secure by Letters Patent, is—

1. In a cooking-vessel, the combination, with the vessel having a pouring lip or spout, of the circular sheet-metal cover and the malleable-iron strainer extending over said pouring-spout, said strainer being secured to said sheet-metal cover, substantially as and for the purposes set forth.

2. In a cooking-vessel, the combination, with the vessel, of a circular sheet-metal cover, a malleable-iron strainer secured thereto and having perforated wings cast thereon, and the flap journaled within said wings, the wings being turned up over pins or bearings on the flap, substantially as and for the purposes set forth.

In testimony whereof we, the said EDWARD L. DAWES and WILLIAM A. MYLER, have hereunto set our hands.

EDWARD L. DAWES.
WM. A. MYLER.

Witnesses:
J. H. LOGAN,
C. C. ROBINGSON.